United States Patent
Cheng

(10) Patent No.: US 11,187,810 B2
(45) Date of Patent: Nov. 30, 2021

(54) GLOBAL NAVIGATION SATELLITE SYSTEM (GNSS) SIGNAL TRACKING

(71) Applicant: u-blox AG, Thalwil (CH)

(72) Inventor: Zhenlan Cheng, Thalwil (CH)

(73) Assignee: u-blox AG, Thalwil (CH)

( * ) Notice: Subject to any disclaimer, the term of this patent is extended or adjusted under 35 U.S.C. 154(b) by 261 days.

(21) Appl. No.: 16/500,049

(22) PCT Filed: Mar. 31, 2017

(86) PCT No.: PCT/EP2017/057773
§ 371 (c)(1),
(2) Date: Oct. 1, 2019

(87) PCT Pub. No.: WO2018/177555
PCT Pub. Date: Oct. 4, 2018

(65) Prior Publication Data
US 2020/0041656 A1 Feb. 6, 2020

(51) Int. Cl.
*G01S 19/23* (2010.01)
*G04R 20/04* (2013.01)

(52) U.S. Cl.
CPC ............ *G01S 19/235* (2013.01); *G01S 19/23* (2013.01); *G04R 20/04* (2013.01)

(58) Field of Classification Search
CPC ........ G01S 19/23; G01S 19/235; G04R 20/04
See application file for complete search history.

(56) References Cited

U.S. PATENT DOCUMENTS

| 2003/0154025 A1 | 8/2003 | Fuchs et al. |
| 2006/0114984 A1* | 6/2006 | Gaal ........................ G01S 19/23 375/240 |

(Continued)

OTHER PUBLICATIONS

International Search Report and Written Opinion dated Dec. 22, 2017, in International Application No. PCT/EP2017/057773 (13 pgs.).

*Primary Examiner* — Bernarr E Gregory
*Assistant Examiner* — Fred H Mull
(74) *Attorney, Agent, or Firm* — Finnegan, Henderson, Farabow, Garrett & Dunner LLP

(57) ABSTRACT

Methods and apparatus for tracking a plurality of satellite signals received by a Global Navigation Satellite System, GNSS, receiver from a plurality of satellites, each satellite signal being processed in a different one of a plurality of channels (100*a-k*; 300*a-k*) of the GNSS receiver. At least one summing unit (116, 120; 356, 358, 360; 366) is configured to sum corresponding correlation values from each of a plurality of sets of correlation values, each set from one of the plurality of channels, to determine a plurality of summed correlation values, wherein each correlation value in a set represents a correlation between a signal derived from a corresponding one of the plurality of received satellite signals, and one of a plurality of replica signals each based on a known position and/or velocity of the GNSS receiver and one of a plurality of estimated receiver timing parameters. A hypothesis evaluation unit (118, 122; 318, 322) is configured to determine a maximum correlation value based on the plurality of summed correlation values, and to determine a most likely one of a plurality of receiver timing hypotheses to be the receiver timing hypothesis corresponding to the maximum correlation value.

21 Claims, 4 Drawing Sheets

(56) References Cited

U.S. PATENT DOCUMENTS

2006/0238418 A1\* 10/2006 Monnerat .............. G01S 19/23
          342/357.25
2008/0205493 A1   8/2008 Kohli et al.
2013/0064270 A1   3/2013 Weill et al.

\* cited by examiner

GLOBAL NAVIGATION SATELLITE SYSTEM (GNSS) SIGNAL TRACKING

CLAIM FOR PRIORITY

This application is a U.S. national phase entry under 35 U.S.C. § 371 from PCT International Application No. PCT/EP2017/057773, filed Mar. 31, 2017, from which this application claims priority and is incorporated herein by reference.

TECHNICAL FIELD

The invention relates to methods and apparatus for tracking satellite signals received by a Global Navigation Satellite System (GNSS) receiver. In particular, the invention may relate to methods and apparatus for use in a GNSS receiver for providing a timing reference.

BACKGROUND

Typical GNSS receivers are configured to receive signals from a plurality of GNSS satellites to determine a navigation solution for the GNSS receiver. The navigation solution is typically an 8-state vector including: 3-dimensional position; 3-dimensional velocity; receiver timing offset; and receiver timing drift. Other GNSS receivers are configured specifically to provide an accurate timing and/or frequency reference, possibly for use in other applications. Such GNSS receivers may be termed "timing modules", "timing receivers" or similar.

A timing receiver may be configured to receive a known position and/or velocity and to use that known position and/or velocity in code tracking loops and carrier tracking loops to track satellite signals received at the GNSS receiver from the GNSS satellites. In particular, a timing receiver may be used at a fixed location where the position and velocity of the timing receiver may either be known in advance and configured within the receiver, or can be resolved to a high degree of accuracy and then set to constants. A timing receiver is configured to determine a receiver timing solution from the tracked GNSS signals, which is a 2-state vector comprising receiver timing offset and receiver timing drift. The determined timing solution is then used to output an accurate timing and/or frequency reference.

Code tracking in a GNSS receiver is accomplished with the help of a delay lock loop (DLL). A DLL tracks and estimates the phase misalignment between an incoming code of the received GNSS satellite signal and a locally generated code replica of the satellite signal. A DLL typically comprises at least two code correlators that correlate a carrier removed signal derived from a received satellite signal with locally generated replica codes produced by at least one code generator. The code generator is controlled by a numerically controlled oscillator (NCO) which keeps track of the code phase of the incoming satellite signal. The outputs of the code correlators are integrated over time to improve noise performance and the resulting signal is used in an algorithm to control the NCO to update the code phase of the locally generated replica code such that the code delay between the received satellite signal and the locally generated replica code is minimized. In exemplary DLLs, there may be more than two code correlators, each producing one of early, prompt and late code correlations. In conventional GNSS receivers there is a separate DLL for each channel and the DLLs operate independently of each other.

Carrier tracking on the other hand may be accomplished using a frequency lock loop (FLL), a phase lock loop (PLL) or a combination of both, e.g. an FLL-assisted PLL. An FLL follows a similar signal processing procedure as a DLL except that the Doppler frequency of the incoming satellite signal is tracked and the FLL estimates the current frequency error. In one implementation, a mixer multiplies a received satellite signal (possibly at an intermediate frequency) with a corresponding locally generated carrier signal provided by a carrier generator. The carrier generator is controlled by an NCO as discussed below. It is noted here that the locally generated carrier signal may be at a frequency corresponding to an intermediate frequency (IF) of the receiver, rather than the actual carrier frequency transmitted by the satellites. That is, the locally generated carrier signal need not be at the frequency transmitted by the satellites and may be at a lower frequency suitable for generating an IF or baseband signal. The output of the mixer, which may be termed a carrier removed signal, is integrated over time to improve noise performance and the resulting signal is used in an algorithm to control the NCO to update the locally generated carrier signal such that its frequency is as close as possible to the carrier (or IF) frequency of the incoming GNSS signal. In traditional GNSS receiver architectures there is usually a separate carrier tracking loop for each channel inside the receiver.

In a timing receiver, because the position and/or velocity of the timing receiver is known and used in the generation of the replica carrier signals, a Doppler shift between the carrier of the received satellite signal and the locally generated carrier signal provided by the NCO is proportional to a difference between a current receiver timing drift solution determined at a previous epoch and a true receiver timing drift. Further, because the known position and/or velocity of the timing receiver is used to determine a code phase delay applied to the replica code, a delay between the carrier removed signal and the replica code signal is proportional to a difference between a current receiver timing offset solution determined at a previous epoch and a true receiver timing offset.

Therefore, timing receivers are able to use the code tracking loops and carrier tracking loops to determine an accurate timing and/or frequency reference.

GNSS timing receivers may implement separate signal tracking and timing solutions in that the tracking loops operate in isolation to timing solution determination. The code and carrier tracking loops provide the code and carrier measurements to a navigation engine, which uses those measurements to determine the receiver timing solution (i.e. receiver timing offset and receiver timing drift). Further, in scenarios where satellites from different GNSS constellations (for example, GPS, Galileo, GLONASS or BeiDou) are used to determine a navigation solution, satellite signals from each GNSS will also require separate tracking loops, which will be separately implemented and require separate elements and different configurations.

SUMMARY

According to the invention in an aspect, there is provided an apparatus for tracking a plurality of satellite signals received by a Global Navigation Satellite System, GNSS, receiver from a plurality of satellites, each satellite signal being processed in a different one of a plurality of channels of the GNSS receiver. The apparatus comprises at least one summing unit configured to sum corresponding correlation values from each of a plurality of sets of correlation values, each set from one of the plurality of channels, to determine a plurality of summed correlation values, wherein each correlation value in a set represents a correlation between a signal derived from a corresponding one of the plurality of received satellite signals, and one of a plurality of replica signals each based on a known position and/or velocity of the GNSS receiver and one of a plurality of estimated receiver timing parameters. The apparatus also comprises a hypothesis evaluation unit configured to determine a maximum correlation value based on the plurality of summed correlation values, and to determine a most likely one of a plurality of receiver timing hypotheses to be the receiver timing hypothesis corresponding to the maximum correlation value.

Exemplary methods and apparatus may be for vector tracking of the satellite signals. Some specific exemplary methods and apparatus may be configured to determine the plurality of receiver timing hypotheses and the hypothesis evaluation unit is configured to determine the most likely of those hypotheses.

The signal derived from the plurality of received satellite signals may be a carrier removed signal or early, prompt and/or late code correlations for a given channel.

Optionally, the plurality of receiver timing hypotheses comprises a plurality of receiver timing offset hypotheses. In some arrangements, at least part of the plurality of estimated receiver timing parameters has been determined by adjusting a current receiver timing offset solution by one of the plurality of receiver timing offset hypotheses. Further, the signal derived from the corresponding one of the plurality of received satellite signals might comprise a default carrier removed signal, and the plurality of replica signals comprises a plurality of replica codes.

As is clear from this specification, the estimated receiver timing parameters may comprise receiver timing offsets and/or receiver timing drifts. Further, each of the plurality of replica codes may comprise a single satellite PRN code time shifted by a different amount. The time shifts may correspond to the receiver timing offset hypotheses.

Some exemplary apparatus further comprise in each channel a code generator configured to generate the plurality of replica codes. The apparatus may further comprise at least one correlator configured to determine a plurality of first correlation values for each channel by correlating the default carrier removed signal with the plurality of replica codes, the first correlation values forming at least part one of the sets of correlation values.

Optionally, the plurality of replica codes comprises an early replica code, a prompt replica code and a late replica code. The apparatus may further comprise: at least one correlator in each channel configured to determine early, prompt and late code correlation values by correlating the default carrier removed signal with each of the early, prompt and late replica codes; and at least one interpolator configured to interpolate first correlation values for each channel based on the early, prompt and late code correlation values, the first correlation values forming at least part of one of the sets of correlation values.

The interpolator may be configured to interpolate the first correlation values at a time shift (or delay) corresponding to one of the plurality of receiver timing offset hypotheses.

In exemplary apparatus, the plurality of receiver timing hypotheses comprises a plurality of receiver timing drift hypotheses. Further, the plurality of replica signals might comprise a plurality of replica carrier signals. Optionally, at least part of the plurality of estimated receiver timing parameters has been determined by adjusting a current receiver timing drift solution by one of the plurality of receiver timing drift hypotheses.

Some apparatus comprise the optional feature that the signal derived from the corresponding one of the plurality of received satellite signals comprises an intermediate frequency, IF, signal. The apparatus might further comprise: a carrier generator in each channel configured to generate the plurality of replica carrier signals; a mixer for multiplying the IF signal with the plurality of replica carrier signals to generate a plurality of carrier removed signals; and at least one correlator configured to determine second correlation values by correlating the plurality of carrier removed signals with a default replica code, the second correlation values forming at least part of one of the sets of correlation values.

Optional apparatus further comprise a Discrete Fourier Transform, DFT, unit configured to determine second correlation values by undertaking a DFT of a signal derived from one or more of early, prompt and late code correlation values generated within the GNSS receiver, the second correlation values forming at least part of one of the sets of correlation values. The DFT might span a range of frequencies encompassing frequencies corresponding to at least part of the plurality of receiver timing parameters. Each of the second correlation values might be indicative of a magnitude of the DFT at a corresponding DFT bin frequency.

In exemplary apparatus, each of the plurality of summed correlation values corresponds to one of the plurality of receiver timing hypotheses, and the hypothesis evaluation unit is configured determine the maximum correlation value by selecting the largest summed correlation value.

Optionally, the apparatus further comprises a navigation engine, wherein the hypothesis evaluation unit is further configured to transfer data related to the most likely receiver timing hypothesis to the navigation engine, and the navigation engine is configured to determine a subsequent receiver timing solution based at least in part on the received data related to the most likely receiver timing hypothesis.

In some exemplary arrangements, the hypothesis evaluation unit is configured to transfer the most likely receiver timing hypothesis to the navigation engine. In other exemplary arrangements, the navigation engine may update a position of the GNSS receiver if, for example, the GNSS receiver is moving at a fixed and known velocity.

The apparatus may further comprising a hypothesis generator configured to generate the plurality of receiver timing hypotheses based on a predicted change in a current and/or previous receiver timing solution. The predicted change may be determined based on variance data from the navigation engine and/or the velocity of the GNSS receiver.

According to the invention in an aspect, there is provided a GNSS receiver comprising an apparatus for tracking a plurality of satellite signals according to any disclosed herein.

According to the invention in an aspect, there is provided a method for tracking a plurality of satellite signals received by a Global Navigation Satellite System, GNSS, receiver from a plurality of satellites, each satellite signal being processed in a different one of a plurality of channels of the GNSS receiver. The method comprises summing, by at least one summing unit, corresponding correlation values from each of a plurality of sets of correlation values, each set from one of the plurality of channels, to determine a plurality of summed correlation values, wherein each correlation value in a set represents a correlation between a signal derived from a corresponding one of the plurality of received satellite signals, and one of a plurality of replica signals each based on a known position and/or velocity of the GNSS receiver and one of a plurality of estimated receiver timing parameters; determining, by a hypothesis evaluation unit, a maximum correlation value based on the plurality of summed correlation values; and determining, by the hypothesis evaluation unit, a most likely one of a plurality of receiver timing hypotheses to be the receiver timing hypothesis corresponding to the maximum correlation value.

Optionally, the plurality of receiver timing hypotheses comprises a plurality of receiver timing offset hypotheses. At least part of the plurality of estimated receiver timing parameters may have been determined by adjusting a current receiver timing offset solution by one of the plurality of receiver timing offset hypotheses. The signal derived from the corresponding one of the plurality of received satellite signals might comprise a default carrier removed signal. Optionally, the plurality of replica signals comprises a plurality of replica codes.

The method might further comprise generating the plurality of replica codes, by a code generator in each channel. At least one correlator might determine a plurality of first correlation values for each channel by correlating the default carrier removed signal with the plurality of replica codes, the first correlation values forming at least part one of the sets of correlation values.

In some exemplary arrangements, the plurality of replica codes comprises an early replica code, a prompt replica code and a late replica code. The method may further comprise determining, by at least one correlator in each channel, early, prompt and late code correlation values by correlating the default carrier removed signal with each of the early, prompt and late replica codes; and interpolating, by at least one interpolator, first correlation values for each channel based on the early, prompt and late code correlation values, the first correlation values forming at least part of one of the sets of correlation values.

Optionally, the plurality of receiver timing hypotheses comprises a plurality of receiver timing drift hypotheses. Further, the plurality of replica signals may comprise a plurality of replica carrier signals. At least part of the plurality of estimated receiver timing parameters may have been determined by adjusting a current receiver timing drift solution by one of the plurality of receiver timing drift hypotheses.

In some methods described herein, the signal derived from the corresponding one of the plurality of received satellite signals comprises an intermediate frequency, IF, signal. Optionally, the method may further comprise generating the plurality of replica carrier signals by a carrier generator in each channel; multiplying, by a mixer, the IF signal with the plurality of replica carrier signals to generate a plurality of carrier removed signals; and determining, by at least one correlator, second correlation values by correlating the plurality of carrier removed signals with a default replica code, the second correlation values forming at least part of one of the sets of correlation values.

The method may further comprise determining, by a Discrete Fourier Transform, DFT, unit, second correlation values by undertaking a DFT of a signal derived from one or more of early, prompt and late code correlation values generated within the GNSS receiver, the second correlation values forming at least part of one of the sets of correlation values. The DFT may span a range of frequencies encompassing frequencies corresponding to at least part of the plurality of receiver timing parameters. Each of the second correlation values may be indicative of a magnitude of the DFT at a corresponding DFT bin frequency.

Optionally, each of the plurality of summed correlation values corresponds to one of the plurality of receiver timing hypotheses. The method may further comprise the hypothesis evaluation unit is determining the maximum correlation value by selecting the largest summed correlation value.

Some methods further comprise the hypothesis evaluation unit transferring data related to the most likely receiver timing hypothesis to a navigation engine; and the navigation engine determining a subsequent receiver timing solution based at least in part on the received data related to the most likely receiver timing hypothesis.

The method may further comprise generating, by a hypothesis generator, the plurality of receiver timing hypotheses based on a predicted change in a current and/or previous receiver timing solution.

According to the invention in an aspect, there is provided a computer program comprising instructions which, when executed on at least one processor, cause the at least one processor to carry out a method according to any described herein.

According to the invention in an aspect, there is provided a carrier containing the computer program mentioned above, wherein the carrier is one of an electronic signal, optical signal, radio signal, or non-transitory computer readable storage medium.

BRIEF DESCRIPTION OF THE DRAWINGS

Exemplary embodiments of the invention are described herein with reference to the accompanying drawings, in which.

DETAILED DESCRIPTION

Generally, disclosed herein are methods and apparatus for vector tracking of a plurality of satellite signals received by a GNSS receiver from a plurality of GNSS satellites. Exemplary methods and apparatus are for use in GNSS timing receivers and are configured to determine a most likely receiver timing hypothesis from a plurality of receiver timing hypotheses. The receiver timing hypotheses represent predictions of an update to a current receiver timing solution. The receiver timing hypotheses may comprise receiver timing offset hypotheses, which are a predicted update to a current receiver timing offset solution, and/or receiver timing drift hypotheses, which are a predicted update to a current receiver timing drift solution.

Figure 1:
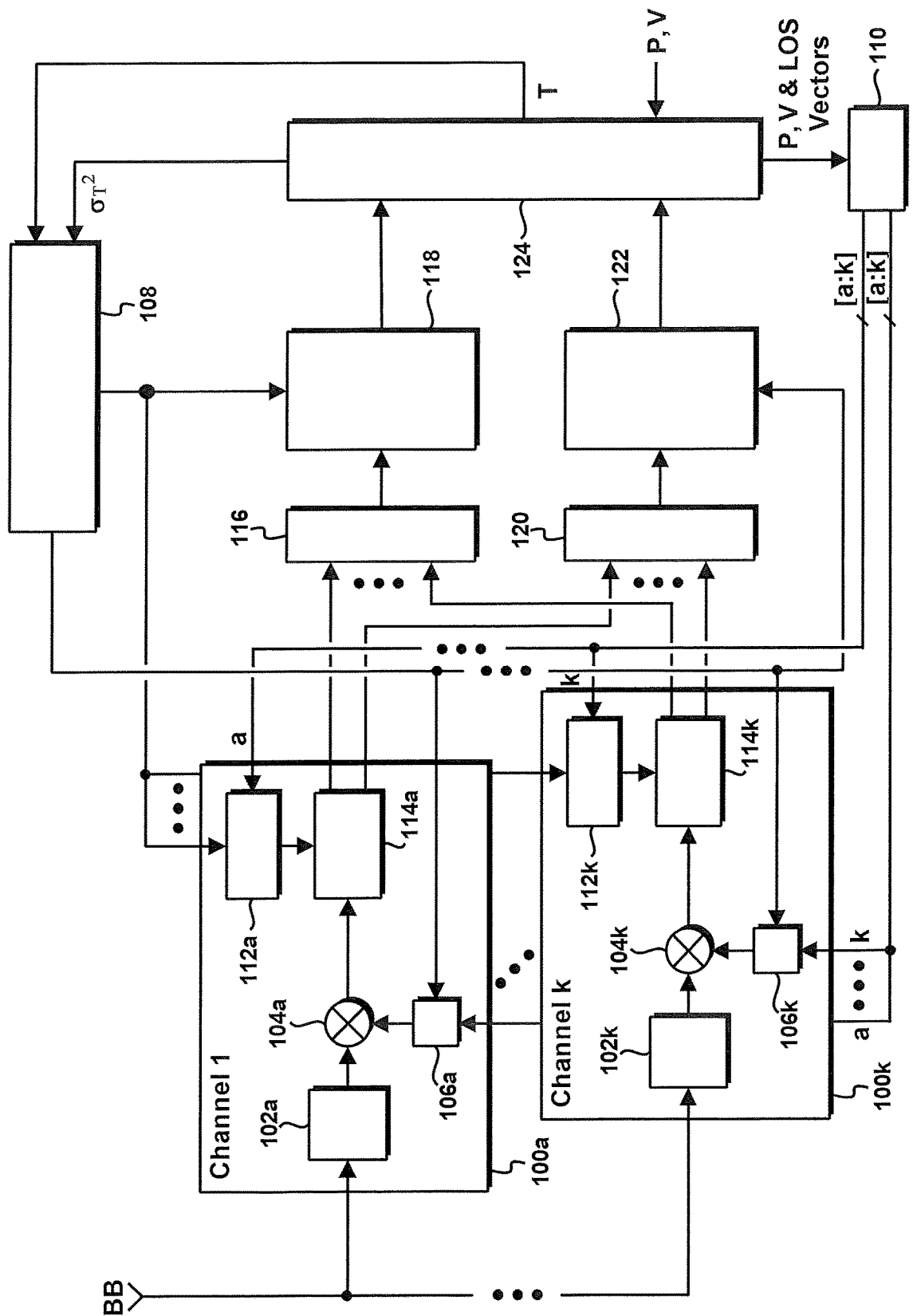
FIG. 1 is a block schematic diagram showing an apparatus for tracking satellite signals.
Figure 3:
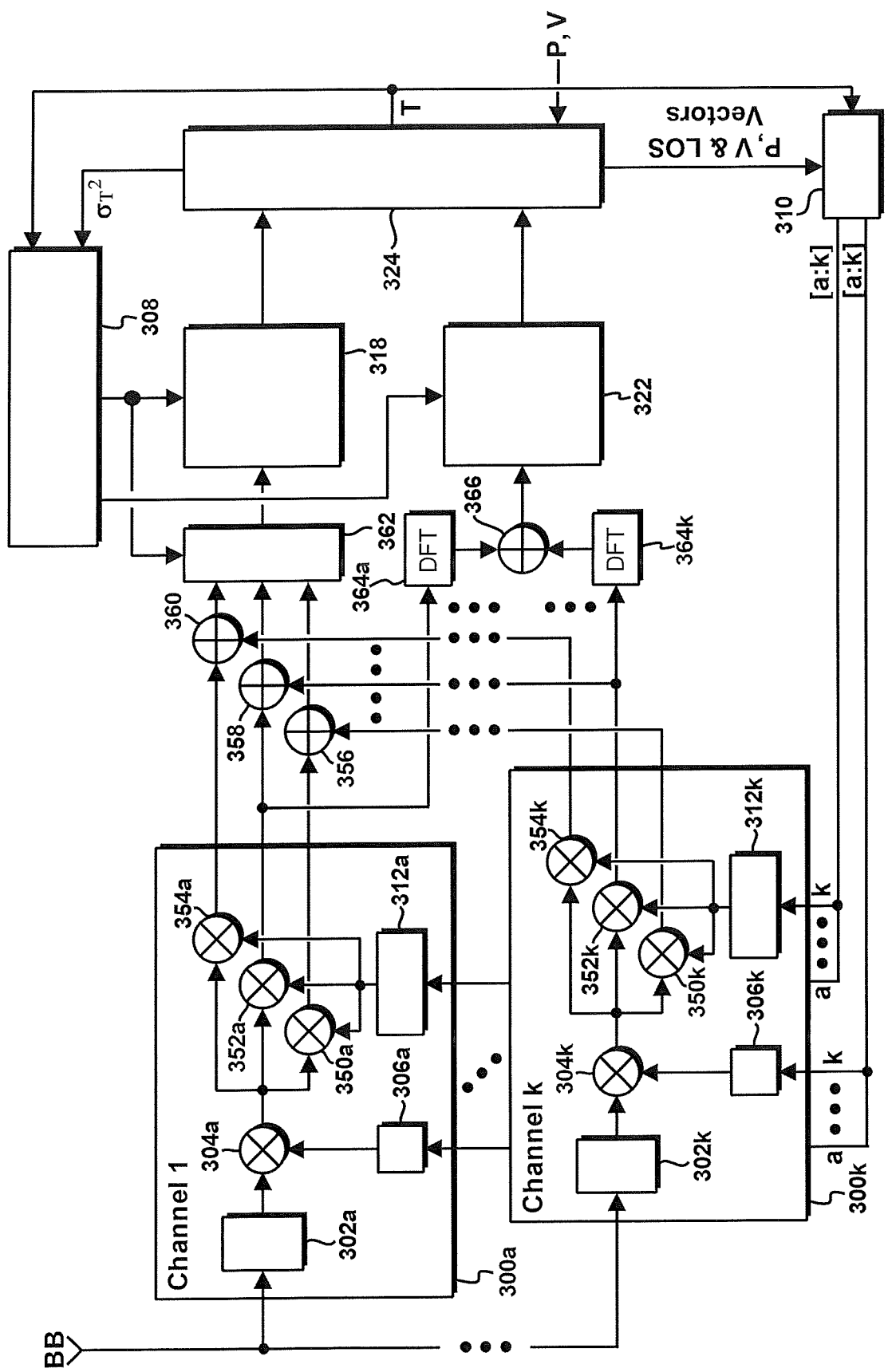
FIG. 3 is a block schematic diagram showing a further apparatus for tracking satellite signals.

Exemplary arrangements generate a plurality of receiver timing offset hypotheses and determine a most likely receiver timing offset hypothesis based on correlation values representing a correlation between a default carrier removed signal and a plurality of locally generated replica code signals. The replica code signals may be generated based on the known position and/or velocity and the plurality of receiver timing offset hypotheses generated from the current receiver timing offset solution. In exemplary methods and apparatus, the correlation values may be determined directly using dedicated apparatus, as shown in FIG. 1. In other exemplary methods and apparatus, the correlation values may be interpolated from early, prompt and late code correlation values, as shown in FIG. 3.

Exemplary methods and apparatus may be configured to generate a plurality of timing drift hypotheses and to determine correlation values indicating an accuracy of each receiver timing drift hypothesis. The correlation values are representative of a correlation between a digitised IF signal and a plurality of replica carrier signals, wherein the replica carrier signals are generated based on known position and/or velocity and the plurality of receiver timing drift hypotheses added to a current timing drift solution. As explained in greater detail below, the correlations may be produced using dedicated apparatus, as shown in FIG. 1, or may be derived by undertaking a DFT of a prompt signal generated in existing GNSS receivers, as shown in FIG. 3.

FIG. 1 shows an exemplary apparatus for tracking satellite signals. The apparatus comprises part of a GNSS timing receiver. The following is a general description of the arrangement of the apparatus in FIG. 1.

A digitised intermediate frequency (IF) signal is received by each of a plurality channels 100*a-k* of the apparatus. Only channels 1 and k are shown in FIG. 1, but it will be appreciated that there may be any number of channels in the apparatus.

The digitised IF signal is derived by a radio frequency (RF) front-end of a GNSS receiver followed by a digital pre-processing unit, both of which are not shown in FIG. 1. Typically, GNSS satellite RF signals are received by a GNSS receiver antenna and are amplified by a low noise preamplifier. The amplified signals are then down-converted from RF to an IF by mixing them with a local oscillator signal. The down-conversion may be undertaken in a number of steps with a different local oscillator in each step. The carrier signal is therefore lowered from the RF carrier frequency, which differs with GNSS constellation, to an IF that can be processed by the channels of the receiver. The carrier Doppler and pseudorandom noise (PRN) codes are preserved in the IF signal. The exemplary methods and apparatus disclosed herein comprise digital signal processing apparatus and the IF signal is therefore digitised in an analogue-to-digital converter (ADC) before being passed to the channels of the receiver. However, it will be appreciated that analogue techniques may also be used.

The apparatus comprises a plurality of channels 100*a-k*. However, for the sake of clarity only a generic channel 100 is described below and the features relating to that channel are referenced numerically only and the suffix (a-k) relating to the channel has been neglected. Each of the channels 100*a-k* can be considered to comprise the same features as the generic channel 100. The channel 100 comprises a buffer 102 configured to receive the digitised IF signal. The buffer 102 is further configured to transfer buffered digital IF samples to a mixer 104. The channel 100 also comprises a carrier generator 106 configured to generate replica carrier signals and transfer them to the mixer 104. The carrier generator 106 is further configured to receive receiver timing drift hypotheses from a hypothesis generator 108 and carrier frequency data from a Default Parameter Generator (CPG) 110. In the exemplary arrangement of FIG. 1, the carrier frequency data does not take account of any receiver timing errors and corresponds to the expected frequency of the digitised IF signal based on a known position and/or velocity of the receiver and line of sight (LOS) data relating to the corresponding satellite. The carrier generator 106 is configured to generate replica carrier signals based on the carrier frequency data and the receiver drift hypotheses, as explained in greater detail below.

The plurality of replica carrier signals are transferred to the mixer 104, which multiplies them with the buffered digitised IF signal to produce a plurality of carrier removed signals.

It is noted here for completeness that interpolation may be used in some exemplary apparatus to ensure intermediate values of the carrier removed signal corresponding or approximately corresponding to the receiver timing offset hypotheses under test are available. The sampling grid used to sample the received satellite signals to produce the digitised IF signal input to the buffer 102 in each channel is unlikely to hit the required receiver timing offset hypothesis exactly, even though the sampling frequency is typically very high. Therefore, an interpolator may be used after the mixer 104 in order to calculate values of the carrier removed signal at delays corresponding to or approximately corresponding to the receiver timing offset hypothesis.

The channel 100 further comprises a PRN code generator 112 (termed a "code generator" herein). The code generator 112 is configured to receive a plurality of receiver timing offset hypotheses from the hypothesis generator 108 and code phase data from the CPG 110. In the exemplary arrangement of FIG. 1, the code phase data does not take account of any receiver timing errors and corresponds to the expected code phase of the PRN code of the digitised IF signal based on a known position and/or velocity of the receiver and LOS data relating to the corresponding satellite. The code generator 112 is configured to generate a plurality of replica codes based on the code phase data and the plurality of receiver timing offset hypotheses.

The code generator 112 is configured to transfer the plurality of replica codes to a correlator 114, which is configured also to receive the plurality of carrier removed signals from the mixer 104.

The correlator 114 is configured to correlate a default carrier removed signal with each of the plurality of replica codes to produce a first set of correlation values. Each of the first set of correlation values represents a likelihood that one of the receiver timing offset hypotheses is correct. The correlator 114 is further configured to correlate each of the plurality of carrier removed signals with a default replica code to produce a second set of correlation values. Each of the second set of correlation values represents a likelihood that one of the receiver timing drift hypotheses is correct.

The term "default" as used herein encompasses a replica code, carrier signal or correlation value that corresponds to the current receiver timing solution given a known position and velocity. That is, a replica code, signal or correlation value that assumes no change in the receiver timing solution from the previous epoch.

Exemplary apparatus also comprise a plurality of integrate-and-dump units (not shown in FIG. 1) that receive the correlation samples and integrate them over time to average out the noise. This is well known in the art. In addition, for clarity further features that may be necessary to put a practical GNSS into effect are not shown in the FIG. 1. Again, these are well known in the art.

A first summing unit 116 is configured to receive and sum the first sets of correlation values from each channel to produce a first set of summed correlation values. In exemplary methods and apparatus, each of the first set of summed correlation values corresponds to one of the receiver timing offset hypotheses. The first summing unit 116 is configured to transfer the first summed correlation values to a first hypothesis evaluation unit 118, which is configured also to receive the receiver timing offset hypotheses from the hypothesis generator 108. The first hypothesis evaluation unit 118 is configured to determine the most likely of the plurality of receiver timing offset hypotheses based on the first set of summed correlation values. In exemplary methods and apparatus, the first hypothesis evaluation unit 118 is configured to select the receiver timing offset hypothesis associated with the largest of the first set of summed correlation values.

A second summing unit 120 is configured to receive and sum the second sets of correlation values from each channel to produce a second set of summed correlation values. In exemplary methods and apparatus, each of the second set of summed correlation values corresponds to one of the receiver timing drift hypotheses. The second summing unit 120 is configured to transfer the second set of summed correlation values to a second hypothesis evaluation unit 122, which is configured also to receive the receiver timing drift hypotheses from the hypothesis generator 108. The second hypothesis evaluation unit 122 is configured to determine the most likely of the plurality of receiver timing drift hypotheses based on the second set of summed correlation values. In exemplary methods and apparatus, the second hypothesis evaluation unit 122 is configured to select the receiver timing drift hypothesis associated with the largest of the second set of summed correlation values.

It is noted that exemplary methods and apparatus may comprise a single summing unit that may be configured to undertake summation of the first and second sets of correlation values sequentially, and a single hypothesis evaluation unit configured to sequentially determine the most likely of the plurality of receiver timing offset and drift hypotheses.

Each of the first and second hypothesis evaluation units 118, 122, respectively, is configured to transfer data relating to the most likely receiver timing offset and/or drift hypotheses to a navigation engine 124, which uses that data to determine an updated receiver timing solution. The transferred data relating to the most likely receiver timing offset and/or drift hypotheses may comprise the most likely receiver timing offset hypothesis and/or the most likely receiver timing drift hypotheses. The navigation engine 124 may also be configured to receive the position and velocity of the receiver.

This may be received from another part of the receiver where the position and velocity have been determined or may be provided by a user. The navigation engine 124 provides receiver timing solution data to the hypothesis generator 108. The navigation engine 124 may be further configured to provide variance data to the hypothesis generator 108, which may be used to determine the receiver timing hypotheses.

Figure 2:
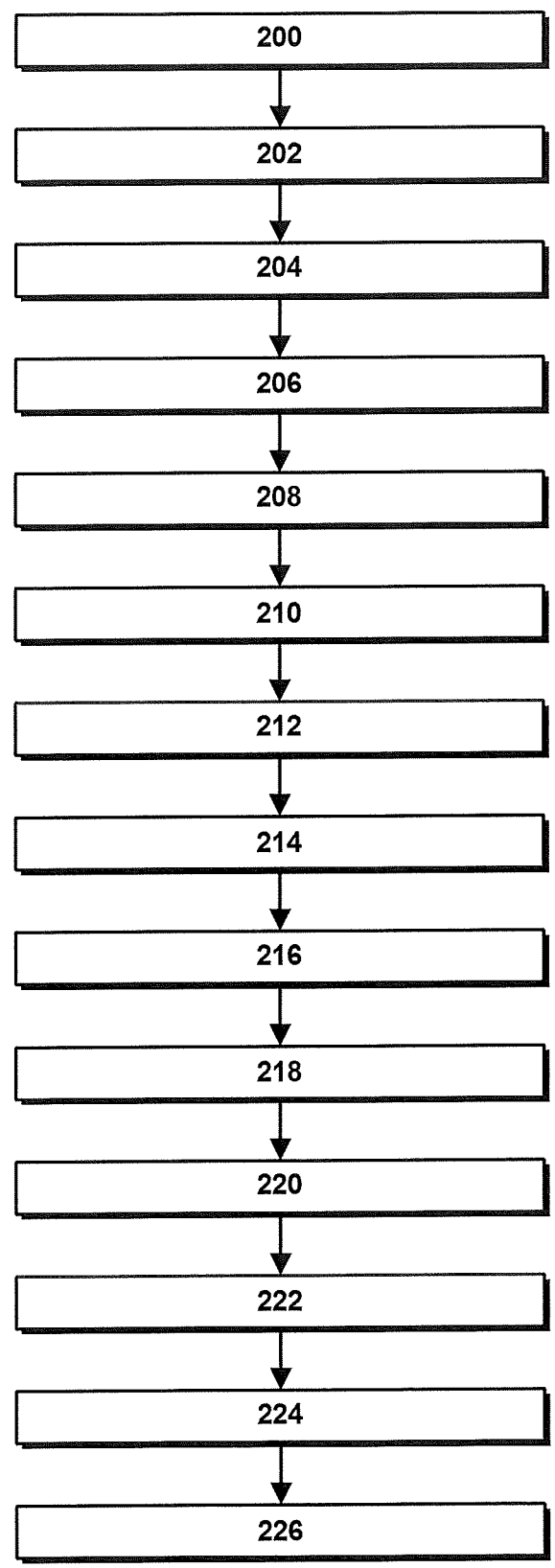
FIG. 2 is a flow diagram showing a method for tracking satellite signals.

There follows a detailed description of the operation of the apparatus of FIG. 1 with reference to FIG. 2.

As an initial step, the position and/or velocity of the GNSS receiver is fixed 200. As mentioned previously, the receiver may be a GNSS timing receiver that is operated in a fixed position. Therefore, the position and velocity of the receiver may be fed into the receiver by a user and then passed to the navigation engine 124. Alternatively, because the GNSS timing receiver is stationary, it can determine its position and velocity to a high degree of accuracy and fix them once the navigation solution has converged. It is noted that the methods and apparatus disclosed herein may also be operated when the velocity of the receiver is constant and known.

The navigation engine 124 determines 202 a current receiver timing solution at epoch n:

$$t_n^{(0)}=[\delta_n^{(0)},\delta'_n^{(0)}]$$

Wherein $\delta_2^{(0)}$ is a receiver timing offset estimate and $\delta'_2^{(0)}$ is a receiver timing drift estimate. The current receiver timing solution is based on estimates of receiver timing offset and receiver timing drift determined at a previous epoch. For the current epoch, $\delta_2^{(0)}$ is referred to as the default receiver timing offset (i.e. that which relates to the current estimate of receiver timing offset), and $\delta'_2^{(0)}$ is referred to as the default receiver timing drift (i.e. that which refers to the current estimate of receiver timing drift).

As an initialization step, the navigation engine 124 may arrive at a first fix of the GNSS receiver and a corresponding first estimate of the receiver timing solution using classical techniques for satellite signal acquisition followed by a least squares estimation of the navigation solution.

The current (or default) receiver timing solution, $t_n^{(0)}$ is transferred by the navigation engine 124 to the hypothesis generator 108.

The CPG 110 receives the known position and/or velocity of the receiver and LOS data for each satellite from the navigation engine 124. The CPG 110 maps the known position and/or velocity to an LOS vector for each satellite and determines 204 the carrier frequency data and code phase data for each satellite. The CPG 110 transfers the carrier frequency data to the carrier generators 106a-k and transfers the code phase data to code generators 112a-k of each of the channels 100a-k corresponding to each satellite.

In the exemplary arrangement of FIG. 1, the carrier and code phase data determined by the CPG 110 are not compensated for receiver timing offset or drift and represent the expected code phase and frequency of the digitised IF signal based solely on the known position and velocity of the receiver and the LOS data for the satellites.

However, it is noted that in alternative arrangements, the CPG 110 may be configured to receive the timing solution from the navigation engine 124 and to adjust the carrier and code phase data to account for the current estimate of the timing solution. In such arrangements, the carrier generators 106a-k and the code generators 112a-k need not receive the default drift and offset hypotheses respectively. The plurality of replica carrier signals and replica codes may be determined by accounting only for the drift and offset hypotheses that hypothesise a change to the current timing solution.

The hypothesis generator 108 receives the current receiver timing solution $t_n^{(0)}$ and also receives variance data from the navigation engine 124. The variance data is determined by the navigation engine 124 in a previous epoch and represents the uncertainty in receiver timing solution between epochs. Therefore, the variance data gives an indication of the likely change in the receiver timing solution in the current epoch. The hypothesis generator 108 generates 206 a plurality of receiver timing drift hypotheses and a plurality of receiver timing offset hypotheses:

$$t_n^{(i)}=[\delta_n^{(0)},\delta'_n(i)], i>0$$

$$t_n^{(j)}=[\delta_n^{(j)},\delta'_n^{(0)}], j>0$$

Where $t_n^{(i)}$ is the plurality of receiver timing drift hypotheses and $t_n^{(j)}$ is the plurality of receiver timing offset hypotheses. It can be seen from the equations above that in $t_n^{(i)}$ each receiver timing drift hypothesis is generated for a fixed receiver timing offset, which is the default receiver timing offset $\delta_n^{(0)}$. Further, in $t_n^{(j)}$ each receiver timing offset hypothesis is generated for a fixed receiver timing drift, which is the default receiver timing drift $\delta'_n^{(0)}$.

Each of the receiver timing offset hypotheses $t_n^{(j)}$ is a hypothesised receiver timing offset solution that is determined by adding or subtracting a predicted change to the previous receiver timing offset solution given by the navigation engine 124. It is noted that the receiver timing offset hypotheses include a default receiver timing offset hypothesis that is equal to $\delta_n^{(0)}$ and therefore assumes no change in receiver timing offset from the previous epoch. Each of the receiver timing drift hypotheses $t_n^{(i)}$ is a hypothesised receiver timing drift solution that is determined by adding or subtracting a predicted change to the default receiver timing drift $\delta'^{(0)}_n$. Similarly, it is also noted that the receiver timing drift hypotheses $t_n^{(i)}$ include a default receiver timing drift hypothesis that is equal to $\delta'^{(0)}_n$ and therefore assumes no change in receiver timing drift from the previous epoch. The predicted change and therefore the separation between each of the generated hypotheses may be based on the variance data received from the navigation engine 124.

The hypothesis generator 108 transfers the generated receiver timing offset hypotheses $t_n^{(j)}$ including, in the case of FIG. 1, the default receiver timing hypothesis to the code generators 112a-k. The hypothesis generator 108 also transfers the receiver timing drift hypotheses $t_n^{(i)}$ including, in the case of FIG. 1, the default receiver timing drift to the carrier generators 106a-k. As mentioned above, the default receiver timing offset and drift hypotheses may form part of the receiver timing offset hypotheses $t_n^{(j)}$ and the receiver timing drift hypotheses $t_n^{(i)}$ respectively.

Before transferring the receiver timing drift hypotheses $t_n^{(i)}$ to the carrier generators 112a-k, the hypothesis generator 108 converts them from a rate of change of time, measured in seconds/second, to a corresponding change in frequency of the digitized IF, measured in Hertz. No conversion of the receiver timing offset hypotheses $t_n^{(j)}$ is necessary as the offset is measured in seconds, as is the corresponding delay in the PRN code.

Therefore, in the exemplary arrangement of FIG. 1, the receiver timing offset hypotheses $t_n^{(j)}$ represent predicted changes in code phase of the digitised IF signal based solely on predicted receiver timing offsets, and the converted receiver timing drift hypotheses $t_n^{(i)}$ represent predicted changes in the frequency of the digitised IF signal based solely on predicted receiver timing drifts.

The carrier generators 106a-k and the code generators 112a-k determine 208 the plurality of replica carrier signals and replica codes. The carrier generators 106a-k each comprise a carrier Numerically Controlled Oscillator (NCO) configured to determine a staircase function, the period of which is the period of the replicated carrier. The carrier generators 106a-k further comprise sine and cosine mapping functions configured to convert the discrete amplitudes of the staircase function to respective amplitudes of sine and cosine (I and Q) functions, which together with the aforementioned period information make up each of the plurality of replica carrier signals.

The plurality of replica carrier signals comprises a default replica carrier signal, which corresponds to the carrier frequency data received from the CPG 110 combined with the default receiver timing drift hypothesis. The plurality of replica carrier signals also comprise replica carrier signals determined by combining the other receiver timing drift hypotheses with the carrier frequency data. As mentioned above, it is noted that the plurality replica carrier signals may actually be at a frequency corresponding to an IF rather than actually being at the frequency of the RF carrier signal at which the GNSS satellite signals are transmitted.

The code generators 112 each comprise a code NCO configured to generate a clocking rate that may be used to determine a replica code. The generated replica code having a particular phase delay may be produced by a shift register.

In a similar fashion to the carrier generators 106a-k, the plurality of replica codes determined by the code generator 112 comprise a default replica code that corresponds to the code phase data received from the CPG 110 combined with the default receiver timing offset hypothesis. The plurality of replica codes also comprise replica codes determined by combining the other receiver timing offset hypotheses with the code phase data received from the CPG 110.

Each of the plurality replica carrier signals includes a Doppler shift that corresponds to each of the receiver timing drift hypotheses generated by the hypothesis generator 108. Further, each of the replica codes includes a phase delay corresponding to each of the receiver timing offset hypotheses.

As mentioned above, the IF signal generated by the RF front end of the receiver is converted to a digitised IF signal and the samples are received by the buffers 102a-k in each of the channels 100a-k. Each of the buffers 102a-k is synchronised and therefore buffers 210 the same set of samples of the digitized IF signal.

The mixers 104a-k multiply 212 the buffered digitised IF signal and the replica carrier signals to produce a plurality of carrier removed signals. The plurality of carrier removed signals comprise a default carrier removed signal that is the result of mixing the buffered digitised IF signal with the default replica carrier signal, and a plurality of further carrier removed signals that are the results of mixing the buffered digitised IF signal with the further replica carrier signals.

The plurality of carrier removed signals are transferred to the correlators 114a-k in the channels 100a-k, which are configured to determine first and second sets of correlation values relating to the receiver timing offset hypotheses and the receiver timing drift hypotheses, respectively. The correlators 114a-k also receive the replica codes corresponding to the GNSS satellite signal being processed in that one of the channels 100a-k.

Each of the correlators 114a-k correlates the corresponding default carrier removed signal with each of the plurality of corresponding replica codes to determine 214 the first set of correlation values for each of the channels 100a-k. The correlators 114a-k of each channel transfer the first sets of correlation values to the first summing unit 116.

Each of the correlators 114a-k correlates each of the plurality of corresponding carrier removed signals with the corresponding default replica code to determine 216 the second set of correlation values for each of the channels 100a-k. The correlator 114 of each channel transfers the second set of correlation values to the second summing unit 120.

Each correlation value of the first sets of correlation values corresponds to a specific receiver timing offset hypothesis. Further, each correlation value of the second sets of correlation values corresponds to a specific receiver timing drift hypothesis.

The first summing unit 116 sums corresponding first correlation values from each set of first correlation values from each of the channels 100a-k, wherein each of the corresponding first correlation values relates to a specific receiver timing offset hypothesis. The first summing unit 116 thereby determines 218 a set of summed first correlation values. Further, the second summing unit 120 sums corresponding second correlation values from each set of second correlation values from each of the channels 100a-k, and each of the corresponding second correlation values relates to a specific receiver timing drift hypothesis. Therefore, the second summing unit 120 determines 220 a set of summed second correlation values.

Because each first and second correlation value in each set of correlation values corresponds to a specific receiver timing offset or drift hypothesis respectively, and because receiver timing errors are common across all channels 100a-k, corresponding first and second correlation values can be summed to increase tracking sensitivity of the apparatus.

The first summing unit 116 transfers the set of summed first correlation values to the first hypothesis evaluation unit 118. The first hypothesis evaluation unit 118 also receives the plurality of receiver timing offset hypotheses. Each summed first correlation value relates to one of the plurality of receiver timing offset hypotheses and so the first hypothesis evaluation unit 118 determines 222 that the most likely receiver timing offset hypothesis is that which relates to the largest summed first correlation value.

Similarly, the second summing unit 120 transfers the set of summed second correlation values to the second hypothesis evaluation unit 122, which also receives the plurality of receiver timing drift hypotheses. Each summed second correlation value relates to one of the plurality of receiver timing drift hypotheses, which allows the second hypothesis evaluation unit 122 to determine 224 the most likely receiver timing drift hypothesis as that which relates to the largest summed second correlation value.

To achieve this, the summed first and second correlation values may be indexed and an index map may be stored by the hypothesis generator 108 to permit the summed first and second correlation values to be mapped to the corresponding receiver timing offset hypothesis.

The first and second hypothesis evaluation units 118, 122 respectively transfer the most likely receiver timing offset and drift hypotheses to the navigation engine 124. The navigation engine 124 uses the most likely hypotheses and the known position and velocity to determine 226 an updated receiver timing solution $\hat{t}_n=[\hat{\delta}_n,\hat{\delta}'_n]$ in an optimal estimation algorithm, such as a Kalman filter.

FIG. 3 shows a further exemplary apparatus for tracking satellite signals. As with FIG. 1, the apparatus comprises part of a GNSS timing receiver. The apparatus of FIG. 3 is configured to use signals output from a plurality of channels 300a-k forming part of existing receiver technologies. More specifically, the apparatus of FIG. 3 is configured to provide vector tracking of a plurality of satellite signals using early, prompt and late code correlation samples that are output from each of the receiver channels 300a-k.

As with the apparatus of FIG. 1, a digitised IF signal is derived by an RF front end (not shown in FIG. 3) and is received by each of the channels 300a-k. Only two channels are shown in FIG. 3, but it will be appreciated that there may be any number of channels in the apparatus.

A generic channel 300 is described herein with reference to FIG. 3. Each of the channels 300a-k may be considered to comprise the same features as the generic channel 300. The channel 300 is configured to determine early, prompt and late code correlation samples for one of a plurality of satellites. An exemplary channel 300 comprises a buffer 302 configured to receive the digitised IF signal and buffer the digitized IF signal before transferring it to a mixer 304. The channel 300 also comprises a carrier generator 306 configured to generate replica carrier signals and transfer them to the mixer 304. The carrier generator 306 is configured to receive carrier frequency data from a CPG 310 and generate a replica carrier signal based on the carrier frequency data.

In the arrangement of FIG. 3, the carrier frequency data is determined based on a known position and/or velocity of the receiver and LOS data relating to the corresponding satellite in a similar fashion to that discussed above. The CPG also compensates the carrier frequency data for current receiver timing errors determined by a navigation engine 324.

The mixer 304 is configured to determine a carrier removed signal based on the buffered digitised IF signal and the replica carrier signal, and to transfer the carrier removed signal to three code correlators: an early code correlator 350, a prompt code correlator 352 and a late code correlator 354.

The channel 300 further comprises a PRN code generator (termed a "code generator" for the remainder of this document) 312. The code generator 312 is configured to receive code phase data from the CPG 310 and generate a replica codel based on the code phase data. The code phase data is determined by the CPG 310 based on a known position and/or velocity of the receiver and LOS data relating to the corresponding satellite in a similar way to that discussed above. The CPG 310 also accounts for current receiver timing errors determined by the navigation engine 324. The code phase data corresponds to the expected code phase of the PRN code of the digitised IF signal.

The code generator 312 is configured to generate early, prompt and late replica codes based on the code phase data and transfer them to the early, prompt and late code correlators 350, 352, 354. As will be understood by a skilled person, typically the code generator 312 is configured to generate three versions of the replica code, namely an early, a prompt and a late, each delayed by a predetermined time offset with respect to the former, e.g. via a shift register. The early, prompt and late code correlators 350, 352, 354 are configured to determine early, prompt and late code correlation samples by correlating the carrier removed signal and the early, prompt and late replica codes.

The features described above are configured to undertake one exemplary method of producing early, prompt and late code correlation samples. The production of early, prompt and late code correlation samples will be well known to a skilled person and other exemplary methods of producing them may also be used. Early, prompt and late code correlation samples are produced in many known GNSS receivers and methods and apparatus disclosed herein provide vector tracking of GNSS satellite signals based on those code correlation samples. Therefore, methods and apparatus disclosed herein may be incorporated into existing GNSS receivers.

The early, prompt and late code correlators 350, 352, 354 transfer the early, prompt and late code correlation samples to early, prompt and late summing units 356, 358, 360. The early, prompt and late summing units 356, 358, 360 are configured to sum respectively the early, prompt and late code correlation samples from a plurality of channels and to provide summed code correlation samples (first correlation values) to an interpolator 362.

The interpolator 362 is configured to receive the summed code correlation samples and also receiver timing offset hypotheses from a hypothesis generator 308. The interpolator 362 is configured to interpolate a value for a summed code correlation at a delay corresponding to each receiver timing offset hypothesis, as explained below, and to provide the interpolated summed code correlation values to a first hypothesis evaluation unit 318 for determining a most likely one of the receiver timing offset hypotheses. The first hypothesis evaluation unit 318 is configured to transfer the determined most likely receiver timing offset hypothesis to the navigation engine 324.

The apparatus also comprises a plurality of Discrete Fourier Transform (DFT) units 364a-k each configured to receive prompt code correlation samples from one of the channels 100a-k. The DFT units 364a-k are configured to undertake a DFT on each of the prompt code correlation values and transfer the results to a summing unit 366.

The DFT units 364a-k are configured to undertake a DFT within a range of frequencies covering expected Doppler shifts for a satellite signal based on the receiver timing drift hypotheses. Therefore, the spectrum coverage is broad enough to cover all the receiver timing drift hypotheses.

A DFT can be considered as a plurality of correlations spanning a frequency range. That is, a DFT of a given signal represents a correlation of that signal with a plurality of further signals at equally spaced frequencies (frequency bins) within a range of frequencies. The result of a DFT comprises a plurality frequency values (bins) and a corresponding plurality of magnitudes (representing a correlation value), which may be plotted to give a frequency spectrum for the signal. Therefore, provided that the DFT spans a frequency range encompassing the expected Doppler shift relating to a given receiver timing drift hypothesis, the magnitude relating to the frequency of the expected Doppler shift represents the correlation value (a second correlation value) for that hypothesis.

The summing unit 366 is configured to sum the magnitude part of the DFT output vector at a given DFT frequency from each of the plurality of channels DFT units 364a-k and transfer the summed magnitudes along with the corresponding frequency bin (index) to a second hypothesis evaluation unit 322. The second hypothesis evaluation unit 322 is configured also to receive a plurality of receiver timing drift hypotheses from the hypothesis generator 308 and to determine a most likely receiver timing drift hypothesis. The second hypothesis evaluation unit 322 is configured to transfer the determined most likely receiver timing drift hypothesis to the navigation engine 324.

The navigation engine 324 is configured to determine an updated receiver timing solution based on the most likely receiver timing offset and drift hypotheses and a known position and velocity of the receiver. The navigation engine 324 is further configured to determine updated LOS data and variance data associated with the updated receiver timing solution. The navigation engine 324 is also configured to transfer the updated receiver timing solution to the hypothesis determiner 308 and the CPG 310, to transfer the variance data to the hypothesis determiner 308 and to transfer the LOS data to the CPG 310.

Figure 4:
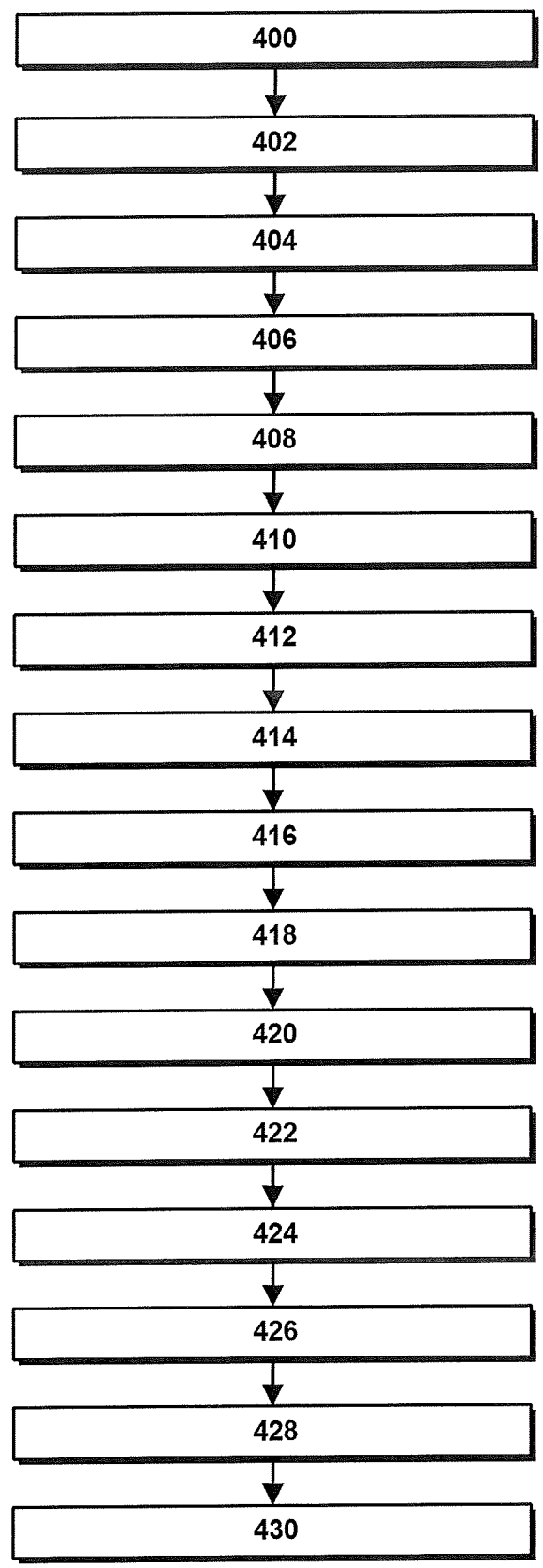
FIG. 4 is a flow diagram showing a further method for tracking satellite signals.

There follows a detailed description of the operation of the apparatus of FIG. 3 with reference to FIG. 4.

As with FIG. 2, in an initial step the position and/or velocity of the GNSS receiver is fixed 400 and the navigation engine determines 402 a current receiver timing solution. These steps are not discussed again in detail here.

The current (or default) receiver timing solution, $t_n^{(0)}$ is transferred by the navigation engine 324 to the hypothesis generator 308 and the CPG 310.

The CPG 310 receives the current receiver timing solution $t_n^{(0)}$, the known position and/or velocity of the receiver and LOS data for each satellite from the navigation engine 324. The CPG 310 maps the known position and/or velocity to an LOS vector for each satellite and determines 404 the carrier frequency data and code phase data for each satellite taking into account the current receiver timing solution $t_n^{(0)}$. The CPG 310 transfers the carrier frequency data to the carrier generators 306a-k and transfers the code phase data to code generators 312a-k of the channels 300a-k corresponding to each satellite.

The hypothesis generator 308 receives the current receiver timing solution $t_n^{(0)}$ and also receives variance data from the navigation engine 324. The hypothesis generator 308 generates 406 a plurality of receiver timing drift hypotheses and a plurality of receiver timing offset hypotheses. This is explained above in respect of FIGS. 1 and 2 and is not discussed in detail again here. The carrier generators 306a-k and the code generators 312a-k determine 408 the replica carrier signals and early, prompt and late replica codes respectively. The carrier generators 306a-k transfer the replica carrier signals to the mixers 304a-k. In a similar way to the apparatus of FIG. 1, the digitised IF is buffered 410 and transferred to the mixers 304a-k, which multiplies 412 the buffered digitised IF signal and the replica carrier signals to produce carrier removed signals for each of the channels 300a-k.

The carrier removed signals are transferred to the early, prompt and late code correlators 350a-k, 352a-k, 354a-k in each of the channels 300a-k. In addition, the code generators 312a-k transfer early, prompt and late replica codes to the early, prompt and late code correlators 350a-k, 352a-k, 354a-k respectively. The early, prompt and late code correlators 350a-k, 352a-k, 354a-k correlate the carrier removed signals with the early, prompt and late replica codes to determine 414 early, prompt and late code correlation samples.

Exemplary apparatus also comprise a plurality of integrate-and-dump units (not shown in FIG. 3) that receive the early, prompt and late code correlation samples and integrate them over time to average out the noise. This is well known in the art. In addition, for clarity further features that may be necessary to put a practical GNSS into effect are not shown in FIG. 3. Again, these are well known in the art.

Each of the channels 300a-k transfers the corresponding early, prompt and late code correlation samples to the respective summing unit 356, 358, 360, where they are summed 416 across a plurality of channels 300a-k to produce early, prompt and late summed code correlation samples. The early summing unit 356, prompt summing unit 358 and late summing unit 360 sums the early code correlation, the prompt code correlation and the late code correlation contributions, respectively from all channels 300a-k to form summed code correlation samples.

The early, prompt and late summed code correlation samples are transferred to the interpolator 362. In addition, the hypothesis generator 308 transfers the receiver timing offset hypotheses to the interpolator 362 and the first hypothesis evaluation unit 318. The interpolator 362 runs an interpolation algorithm to determine 418 a first set of correlation values each corresponding to a receiver timing offset hypothesis.

Each of the early and late code correlation samples corresponds to a phase delay (which may be positive or negative) with respect to the prompt code correlation samples. The range of phase delay from the early code correlation samples to the late code correlation samples is sufficient to encompass the delays associated with the receiver timing offset hypotheses. The interpolator 362 may therefore interpolate summed code correlation samples at delays corresponding to each of the receiver timing offset hypotheses based on the early, prompt and late summed code correlation samples. The interpolated summed code correlation samples each have a magnitude representative of the likelihood that the corresponding receiver timing offset hypothesis is correct.

The interpolated summed code correlation samples are transferred to the first hypothesis evaluation unit 318, which determines 422 the receiver timing offset hypothesis corresponding to the interpolated summed code correlation value with the highest value as the most likely receiver timing offset hypothesis.

In addition, the prompt code correlation samples from each of the channels 300a-k are each transferred to one of the plurality of DFT units 364a-k. The DFT units 364a-k undertake 424 a DFT on the prompt code correlation samples and transfer the results to the summing unit 366. The summing unit 366 sums 426 the results of the DFT operation performed in step 424 and transfers the resulting summed magnitudes along with corresponding frequency bin (index) to the second hypothesis evaluation unit 322.

The second hypothesis evaluation unit 322 determines 428 the receiver timing drift hypothesis corresponding to the frequency bin of the summed magnitude having the largest magnitude to be the most likely receiver timing drift hypothesis.

The most likely receiver timing offset and drift hypothesis is transferred to the navigation engine 324 for determination 430 of an updated timing solution.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. An apparatus for tracking a plurality of satellite signals received by a Global Navigation Satellite System, (GNSS) receiver from a plurality of satellites, each satellite signal being processed in a different one of a plurality of channels of the GNSS receiver, the apparatus comprising:
   at least one summing unit configured to sum corresponding correlation values from each of a plurality of sets of correlation values, each set from one of the plurality of channels, to determine a plurality of summed correlation values, wherein each correlation value in a set represents a correlation between a signal derived from a corresponding one of the plurality of received satellite signals, and one of a plurality of replica signals each based on a known position and/or velocity of the GNSS receiver and one of a plurality of estimated receiver timing parameters; and
   a hypothesis evaluation unit configured to determine a maximum correlation value based on the plurality of summed correlation values, and to determine a most likely one of a plurality of receiver timing hypotheses to be the receiver timing hypothesis corresponding to the maximum correlation value.

2. An apparatus according to claim 1, wherein the plurality of receiver timing hypotheses comprises a plurality of receiver timing offset hypotheses,
   at least part of the plurality of estimated receiver timing parameters has been determined by adjusting a current receiver timing offset solution by one of the plurality of receiver timing offset hypotheses,
   the signal derived from the corresponding one of the plurality of received satellite signals comprises a default carrier removed signal, and
   the plurality of replica signals comprises a plurality of replica codes.

3. An apparatus according to claim 2, further comprising in each channel a code generator configured to generate the plurality of replica codes,
 the apparatus further comprising at least one correlator configured to determine a plurality of first correlation values for each channel by correlating the default carrier removed signal with the plurality of replica codes, the first correlation values forming at least part one of the sets of correlation values.

4. An apparatus according to claim 2, wherein the plurality of replica codes comprises an early replica code, a prompt replica code and a late replica code,
 the apparatus further comprising:
  at least one correlator in each channel configured to determine early, prompt and late code correlation values by correlating the default carrier removed signal with each of the early, prompt and late replica codes; and
  at least one interpolator configured to interpolate first correlation values for each channel based on the early, prompt and late code correlation values, the first correlation values forming at least part of one of the sets of correlation values.

5. An apparatus according to claim 1, wherein the plurality of receiver timing hypotheses comprises a plurality of receiver timing drift hypotheses,
 the plurality of replica signals comprises a plurality of replica carrier signals, and
 at least part of the plurality of estimated receiver timing parameters has been determined by adjusting a current receiver timing drift solution by one of the plurality of receiver timing drift hypotheses.

6. An apparatus according to claim 5, wherein the signal derived from the corresponding one of the plurality of received satellite signals comprises an intermediate frequency (IF) signal,
 the apparatus further comprising:
  a carrier generator in each channel configured to generate the plurality of replica carrier signals;
  a mixer for multiplying the IF signal with the plurality of replica carrier signals to generate a plurality of carrier removed signals; and
  at least one correlator configured to determine second correlation values by correlating the plurality of carrier removed signals with a default replica code, the second correlation values forming at least part of one of the sets of correlation values.

7. An apparatus according to claim 5, further comprising a Discrete Fourier Transform (DFT) unit configured to determine second correlation values by undertaking a DFT of a signal derived from one or more of early, prompt and late code correlation values generated within the GNSS receiver, the second correlation values forming at least part of one of the sets of correlation values,
 wherein the DFT spans a range of frequencies encompassing frequencies corresponding to at least part of the plurality of receiver timing parameters,
 and wherein each of the second correlation values is indicative of a magnitude of the DFT at a corresponding DFT bin frequency.

8. An apparatus according to claim 1, wherein each of the plurality of summed correlation values corresponds to one of the plurality of receiver timing hypotheses,
 and wherein the hypothesis evaluation unit is configured to determine the maximum correlation value by selecting the largest summed correlation value.

9. An apparatus according to claim 1, further comprising a navigation engine,
 wherein the hypothesis evaluation unit is further configured to transfer data related to the most likely receiver timing hypothesis to the navigation engine,
 and wherein the navigation engine is configured to determine a subsequent receiver timing solution based at least in part on the received data related to the most likely receiver timing hypothesis.

10. An apparatus according to claim 1, further comprising a hypothesis generator configured to generate the plurality of receiver timing hypotheses based on a predicted change in a current and/or previous receiver timing solution.

11. A method for tracking a plurality of satellite signals received by a Global Navigation Satellite System (GNSS) receiver from a plurality of satellites, each satellite signal being processed in a different one of a plurality of channels of the GNSS receiver, the method comprising:
 summing, by at least one summing unit, corresponding correlation values from each of a plurality of sets of correlation values, each set from one of the plurality of channels, to determine a plurality of summed correlation values, wherein each correlation value in a set represents a correlation between a signal derived from a corresponding one of the plurality of received satellite signals, and one of a plurality of replica signals each based on a known position and/or velocity of the GNSS receiver and one of a plurality of estimated receiver timing parameters;
 determining, by a hypothesis evaluation unit, a maximum correlation value based on the plurality of summed correlation values; and
 determining, by the hypothesis evaluation unit, a most likely one of a plurality of receiver timing hypotheses to be the receiver timing hypothesis corresponding to the maximum correlation value.

12. A method according to claim 11, wherein;
 the plurality of receiver timing hypotheses comprises a plurality of receiver timing offset hypotheses,
 at least part of the plurality of estimated receiver timing parameters has been determined by adjusting a current receiver timing offset solution by one of the plurality of receiver timing offset hypotheses,
 the signal derived from the corresponding one of the plurality of received satellite signals comprises a default carrier removed signal, and
 the plurality of replica signals comprises a plurality of replica codes.

13. A method according to claim 12, further comprising:
 generating the plurality of replica codes, by a code generator in each channel; and
 determining, by at least one correlator, a plurality of first correlation values for each channel by correlating the default carrier removed signal with the plurality of replica codes, the first correlation values forming at least part one of the sets of correlation values.

14. A method according to claim 12, wherein the plurality of replica codes comprises an early replica code, a prompt replica code and a late replica code,
 the method further comprising:
  determining, by at least one correlator in each channel, early, prompt and late code correlation values by correlating the default carrier removed signal with each of the early, prompt and late replica codes; and
  interpolating, by at least one interpolator, first correlation values for each channel based on the early, prompt and late code correlation values, the first correlation values forming at least part of one of the sets of correlation values.

15. A method according to any of claim 11, wherein the plurality of receiver timing hypotheses comprises a plurality of receiver timing drift hypotheses,
the plurality of replica signals comprises a plurality of replica carrier signals, and
at least part of the plurality of estimated receiver timing parameters has been determined by adjusting a current receiver timing drift solution by one of the plurality of receiver timing drift hypotheses.

16. A method according to claim 15, wherein the signal derived from the corresponding one of the plurality of received satellite signals comprises an intermediate frequency (IF) signal,
the method further comprising:
generating the plurality of replica carrier signals by a carrier generator in each channel;
multiplying, by a mixer, the IF signal with the plurality of replica carrier signals to generate a plurality of carrier removed signals; and
determining, by at least one correlator, second correlation values by correlating the plurality of carrier removed signals with a default replica code, the second correlation values forming at least part of one of the sets of correlation values.

17. A method according to claim 15, further comprising:
determining, by a Discrete Fourier Transform (DFT) unit, second correlation values by undertaking a DFT of a signal derived from one or more of early, prompt and late code correlation values generated within the GNSS receiver, the second correlation values forming at least part of one of the sets of correlation values,
wherein the DFT spans a range of frequencies encompassing frequencies corresponding to at least part of the plurality of receiver timing parameters,
and wherein each of the second correlation values is indicative of a magnitude of the DFT at a corresponding DFT bin frequency.

18. A method according to any of claim 11, wherein each of the plurality of summed correlation values corresponds to one of the plurality of receiver timing hypotheses,
and further comprising the hypothesis evaluation unit is determining the maximum correlation value by selecting the largest summed correlation value.

19. A method according to any of claim 11, further comprising:
the hypothesis evaluation unit transferring data related to the most likely receiver timing hypothesis to a navigation engine; and
the navigation engine determining a subsequent receiver timing solution based at least in part on the received data related to the most likely receiver timing hypothesis.

20. A method according to any of claim 11, further comprising generating, by a hypothesis generator, the plurality of receiver timing hypotheses based on a predicted change in a current and/or previous receiver timing solution.

21. A non-transitory computer-readable medium storing instructions that, when executed on at least one processor, cause the at least one processor to carry out the method according to claim 11.

* * * * *